United States Patent
Xie

(10) Patent No.: US 9,918,482 B1
(45) Date of Patent: Mar. 20, 2018

(54) BALL-SHAPED FOOD FORMING MACHINE

(71) Applicant: Dasin Machinery Co., Ltd., Nantou County (TW)

(72) Inventor: Da-You Xie, Nantou County (TW)

(73) Assignee: Dasin Machinery Co., Ltd., Nantou County (TW)

( * ) Notice: Subject to any disclaimer, the term of this patent is extended or adjusted under 35 U.S.C. 154(b) by 0 days.

(21) Appl. No.: 15/708,638

(22) Filed: Sep. 19, 2017

(30) Foreign Application Priority Data

Sep. 20, 2016 (TW) .............................. 105130365 A

(51) Int. Cl.
*A21C 11/10* (2006.01)
*A21C 9/00* (2006.01)
*A21C 7/00* (2006.01)
*A23P 30/10* (2016.01)
*A21C 3/02* (2006.01)

(52) U.S. Cl.
CPC ................ *A21C 9/00* (2013.01); *A21C 11/10* (2013.01); *A21C 3/02* (2013.01); *A21C 7/005* (2013.01); *A23P 30/10* (2016.08)

(58) Field of Classification Search
CPC .. A21C 3/02; A21C 7/005; A21C 9/00; A21C 11/10; A23P 30/10
See application file for complete search history.

(56) References Cited

U.S. PATENT DOCUMENTS 3,272,153 A * 9/1966 Morabito ................. A21C 5/00
425/297
4,368,019 A * 1/1983 Thompson ............. A21C 11/10
425/141

FOREIGN PATENT DOCUMENTS

| TW | 217538 | 12/1993 |
| TW | 285833 | 9/1996 |
| TW | M432270 | 7/2012 |

* cited by examiner

*Primary Examiner* — James P Mackey
(74) *Attorney, Agent, or Firm* — Muncy, Geissler, Olds & Lowe, P.C.

(57) ABSTRACT

A ball-shaped food forming machine includes a casing, a pair of sheet-forming rollers, a sheet guide, a cutter roller, a cutter blade, a first ball-forming roller and a second ball-forming roller. The casing includes a receiving chamber. The sheet-forming rollers define a sheet-forming gap therebetween. The sheet guide has a cutting end. The cutter blade is disposed on the cutter roller and rotate along with the cutter roller. When the cutter blade rotated to a first position, a distal end of the cutter blade is right adjacent to the cutting end of the sheet guide. The first and second ball-forming rollers define a plurality of ball-forming gaps therebetween. The first ball-forming roller is closer to the cutter blade than the second ball-forming roller. Thereby, a food slug can be efficiently formed into ball-shaped food.

14 Claims, 8 Drawing Sheets

BALL-SHAPED FOOD FORMING MACHINE

BACKGROUND OF THE INVENTION

Field of the Invention

The present invention relates generally to a food processing machine, and more particularly to a ball-shaped food forming machine which could produce a ball-shaped food by cutting a soft food slug.

Description of the Prior Art

Ball-shaped foods such as tangyuan (dumpling), tapioca balls, pearl balls, fish balls and meat balls are very common in Chinese culture. These ball-shaped foods are usually manually prepared by kneading. The preparation is time consuming and labor intensive, and thus it is not conducive to mass production.

To increase production efficiency and reduce production cost, it is a trend to produce processed foods by automated machines. Thus there is a need to provide a ball-shaped food processing machine with good processing speed and low error rate.

SUMMARY OF THE INVENTION

One object of the present invention is to provide a food processing machine which can efficiently prepare ball-shaped food from a food slug.

To achieve the above and other objects, the present invention provides a ball-shaped food forming machine, which is used to cut a food slug to form a ball-shaped food, and includes a casing, a pair of sheet-forming rollers, a sheet guide, a cutter roller, a cutter blade, a first ball-forming roller and a second ball-forming roller. The casing has a receiving chamber where the food slug is placed in. The sheet-forming rollers are rotatably positioned in the casing, and a sheet-forming gap is defined between the pair of sheet-forming rollers, wherein the sheet-forming gap is communicated with the receiving chamber, so that the food slug placed in the receiving chamber is able to be pressed to form a food sheet. The sheet guide is fixed in the casing, and has a cutting end, wherein the sheet guide is adapted to guide the food sheet, which is pressed from the sheet-forming gap, to the cutting end. The cutter roller is rotatably positioned in the casing, and the cutter blade is positioned on the cutter roller, wherein the cutter blade is drivable by the cutter roller to rotate about an axis of the cutter roller. When the cutter blade rotates to a first position, a distal end of the cutter blade is right adjacent to the cutting end of the sheet guide in a manner that the food sheet is able to be cut into food strips. The first ball-forming roller is rotatably positioned in the casing, and has a wavy surface having a plurality of annular first peaks and a plurality of annular first valleys, wherein each of the first valleys is between two of the adjacent first peaks. The second ball-forming roller is rotatably positioned in the casing, and has a wavy surface having a plurality of annular second peaks and a plurality of annular second valleys, wherein each of the second valleys is between two of the adjacent second peaks. The first peaks are respectively corresponding to the second peaks while the first valleys are respectively corresponding to the second valleys. A plurality of ball-forming gaps are defined between the first ball-forming roller and the second ball-forming roller, and the first peaks are right adjacent to the corresponding second peaks respectively. The first ball-forming roller is closer to the cutter blade than the second ball-forming roller. The first ball-forming roller and the second ball-forming roller are adapted to further cut and press the food strips cut by the cutter blade through the ball-forming gaps to form a plurality of ball-shaped foods.

To achieve the above and other objects, the present invention further provides a ball-shaped food forming machine, which includes a casing, a pair of sheet-forming rollers, a sheet guide, a cutter roller, a cutter blade, a first ball-forming roller and a second ball-forming roller. The casing has an receiving chamber. The sheet-forming rollers are rotatably positioned in the casing, and a sheet-forming gap is defined between the pair of sheet-forming rollers. The sheet guide is fixed in the casing, and has a cutting end, wherein the sheet guide and the receiving chamber are respectively positioned at two opposite sides of the sheet-forming gap. The cutter roller is rotatably positioned in the casing, and the cutter blade is positioned on the cutter roller, wherein the cutter blade is drivable by the cutter roller to rotate about an axis of the cutter roller. When the cutter blade rotates to a first position, a distal end of the cutter blade is right adjacent to the cutting end of the sheet guide. The first ball-forming roller is rotatably positioned in the casing, and has a wavy surface having a plurality of annular first peaks and a plurality of annular first valleys, wherein each of the first valleys is between two of the adjacent first peaks. The second ball-forming roller is rotatably positioned in the casing, and has a wavy surface having a plurality of annular second peaks and a plurality of annular second valleys, wherein each of the second valleys is between two of the adjacent second peaks. The first peaks are respectively corresponding to the second peaks while the first valleys are respectively corresponding to the second valleys. A plurality of ball-forming gap are defined between the first ball-forming roller and the second ball-forming roller, and the first peaks are right adjacent to the corresponding second peaks. The first ball-forming roller is closer to the cutter blade than the second ball-forming roller. The first ball-forming roller and the second ball-forming roller are positioned under the sheet guide and the cutter blade.

According to the aforementioned invention, the helpful efficiency of the present invention is that, the food slug is able to be processed to form the ball-shaped food fast, and the error rate in the production process would be lowered, so as to reduce the time of troubleshooting. Therefore, the production capacity would be efficiently increased, and the processing cost could be decreased.

DETAILED DESCRIPTION OF THE PREFERRED EMBODIMENTS

Figure 1:
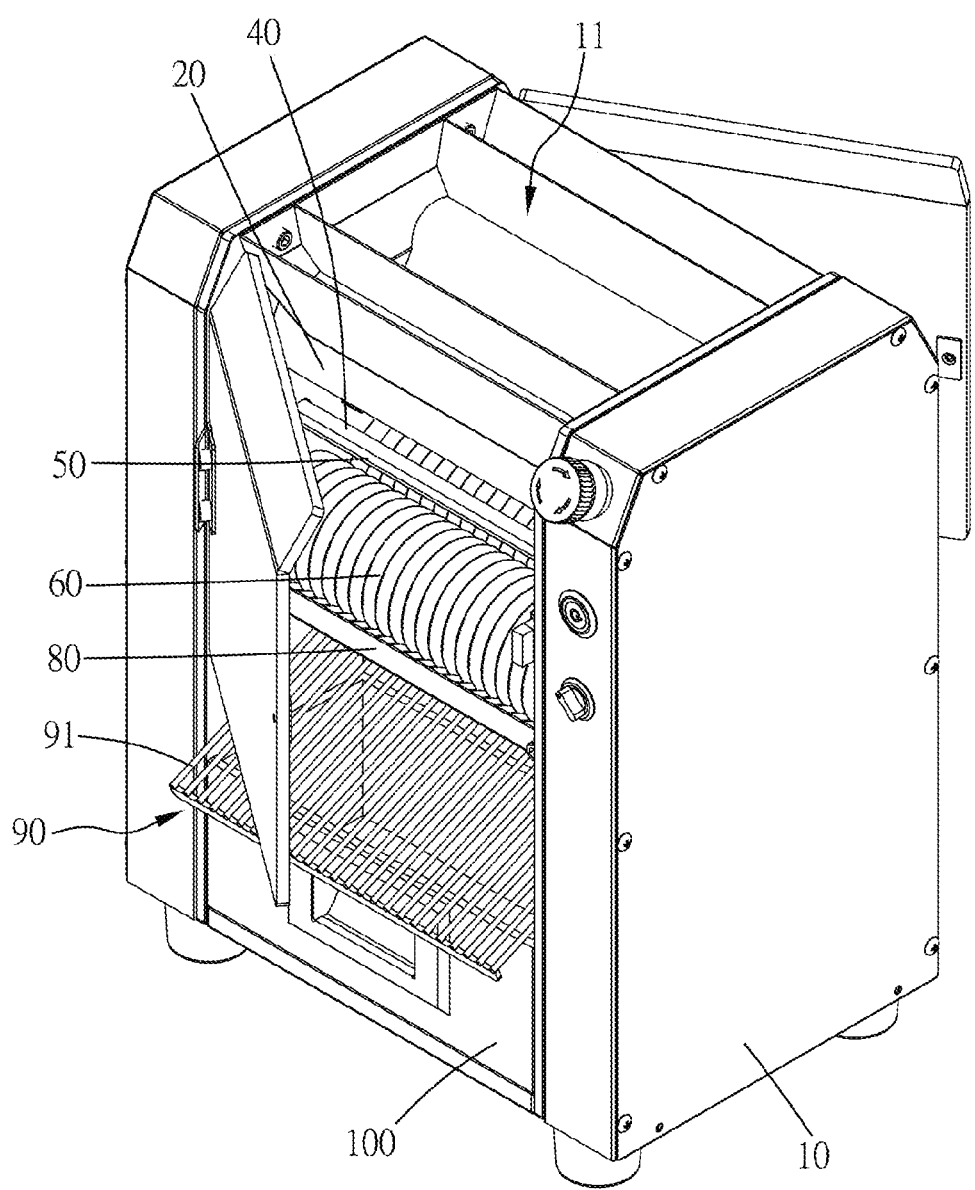
FIG. 1 is a 3-dimensional view showing a ball-shaped food forming machine of an embodiment of the present invention.
Figure 2:
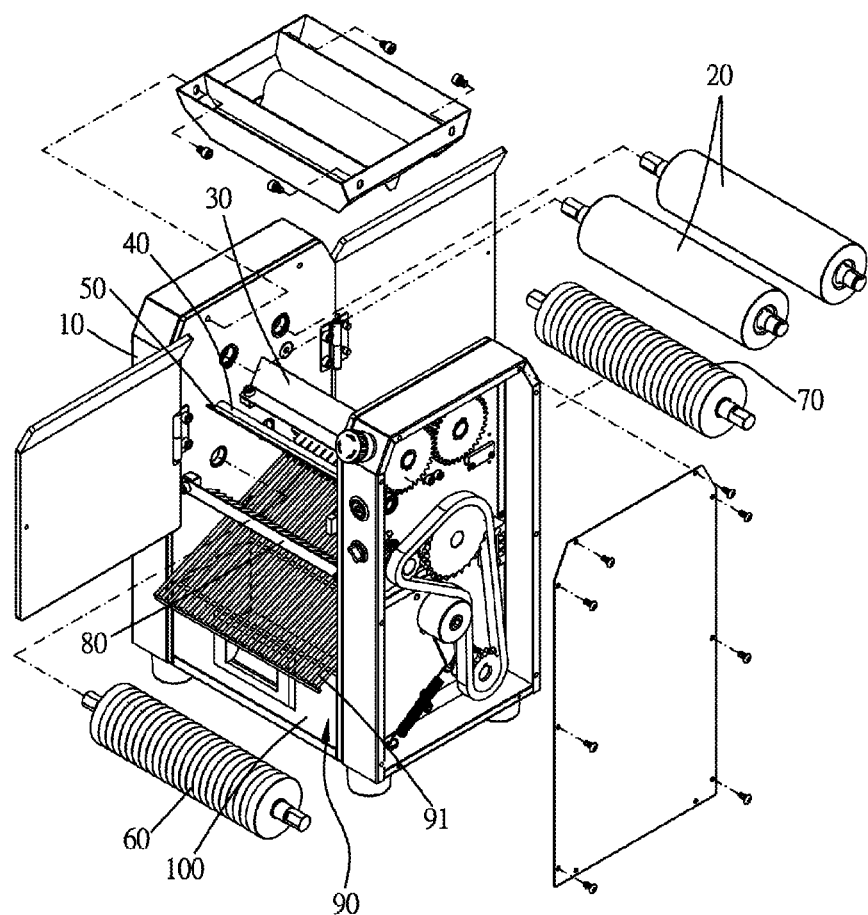
FIG. 2 is a partial explosive drawing showing the ball-shaped food forming machine of the embodiment of the present invention.
Figure 3:
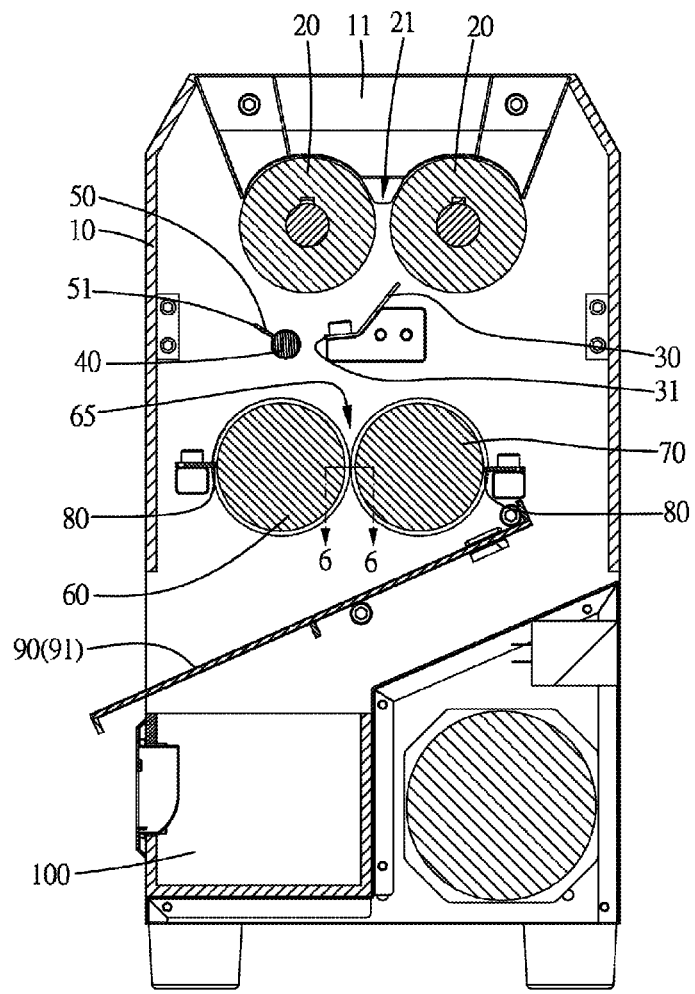
FIG. 3 is a vertical cross sectional view showing the ball-shaped food forming machine of the embodiment of the present invention.

Please refer to FIG. 1 to FIG. 3 for a ball-shaped food forming machine in accordance with an embodiment of the present invention. The ball-shaped food forming machine includes a casing 10, a pair of sheet-forming rollers 20, a sheet guide 30, a cutter roller 40, a cutter blade 50, a first ball-forming roller 60 and a second ball-forming roller 70. The sheet-forming rollers 20, the cutter roller 40, the cutter blade 50, the first ball-forming roller 60 and the second ball-forming roller 70 are parallel to each other.

The casing 10 has two side sheets respectively at the right side and the left side of the casing 10, and the front side and the rear side of the casing 10 are substantially open. The casing 10 has an receiving chamber 11 at the top of the casing 10, wherein the top and the bottom of the receiving chamber 11 are open, and preferably, the receiving chamber 11 is in funnel shape. One or more cases are positioned on at least one of the right side and the left side of the casing 10, and a driving and transmission mechanism could be positioned in the one or more cases. The driving and transmission mechanism is adapted to drive the sheet-forming roller 30, the cutter roller 40, the first ball-forming roller 60 and the second ball-forming roller 70 to rotate. The casing 10 could further include door panels pivotally positioned at the front side and the rear side of the casing 10.

Figure 3A:
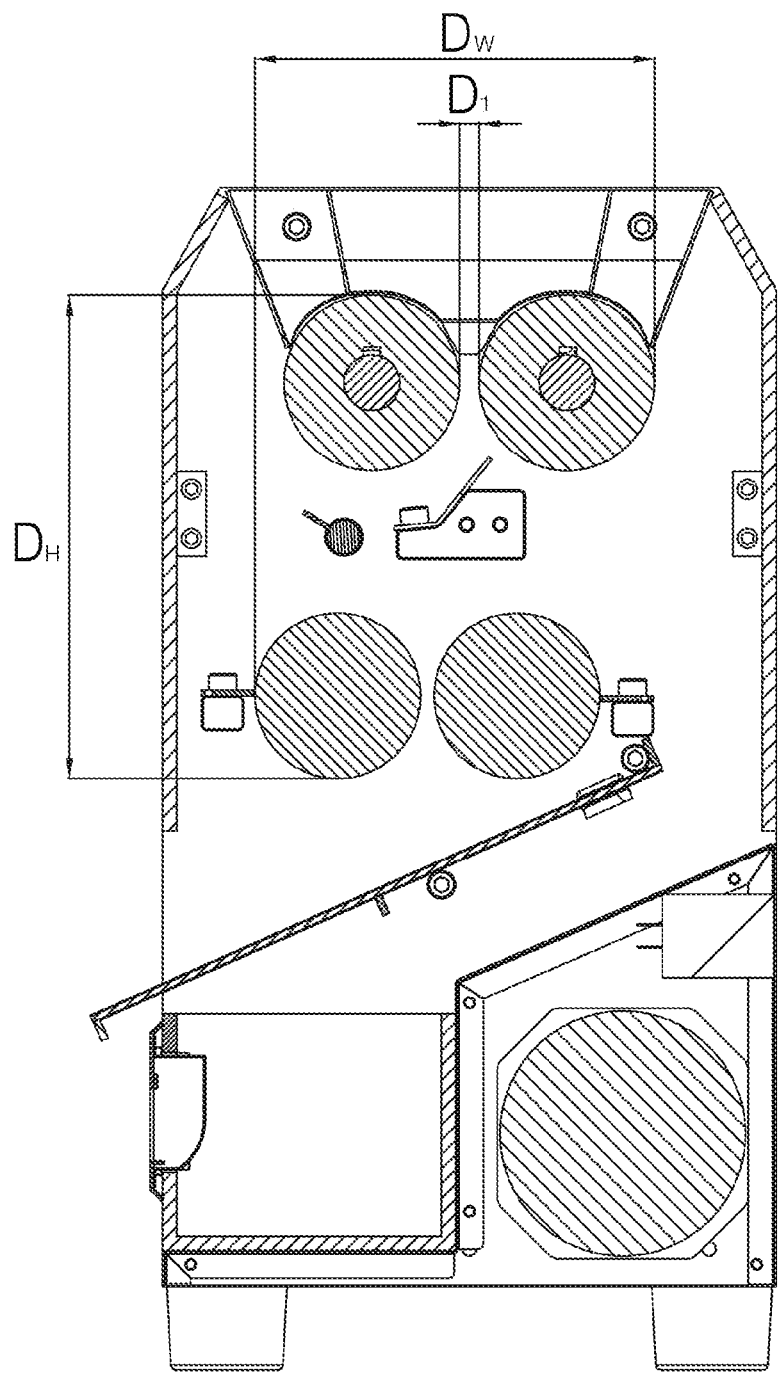
FIG. 3A is a vertical cross sectional view showing the ball-shaped food forming machine of the embodiment of the present invention.
Figure 4:
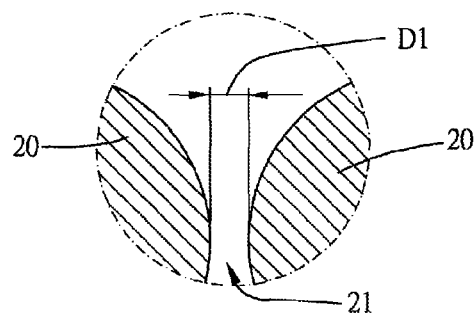
FIG. 4 is a partial enlarged view showing the ball-shaped food forming machine of the embodiment of the present invention, which mainly presents sheet-forming gaps between two sheet-forming rollers.

The pair of sheet-forming rollers 20 are rotatably positioned in the casing 10 in the same level. A sheet-forming gap 21 is defined by the shortest distance between the sheet-forming rollers 20, and the width of the sheet-forming gap 21 is D1 as shown in FIG. 4. Both of the rotation directions of the sheet-forming rollers 20 at the sheet-forming gap 21 would be from top to bottom. As shown in FIG. 3A, the left sheet-forming roller 20 rotates clockwise, while the right sheet-forming roller 20 rotates counter clockwise.

The sheet guide 30 is fixed in the casing 10 and has a cutting end 31. The sheet guide 30 and the receiving chamber 11 are respectively positioned at two opposite side of the sheet-forming gap 21. Specifically, the receiving chamber 11 is positioned atop the sheet-forming gap 21, and the sheet guide 30 is positioned under the sheet-forming gap 21. In the present embodiment, the extended direction of the sheet guide 30 is substantially tilted, so that the food sheet on the sheet guide 30 would slide more easily.

The cutter roller 40 is rotatably positioned in the casing 10, and the cutter blade 50 is positioned on the cutter roller 40. The cutter blade 50 is drivable by the cutter roller 40 to rotate about an axis of the cutter roller 40. As the dashed line shown in FIG. 5, when the cutter blade 50 rotates to a first position, a distal end 51 of the cutter blade 50 is right adjacent to the cutting end 31 of the sheet guide 30. Specifically, the gap between the distal end 51 and the cutting end 31 is so small that it can trim the food sheet by shear force. Further, the rotation direction of the cutter blade 50 at such position is preferably from top to bottom.

Figure 5:
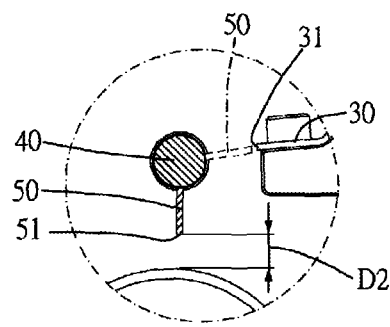
FIG. 5 is a partial enlarged view showing the ball-shaped food forming machine of the embodiment of the present invention, which mainly presents the relative positions of cutter blades, a sheet guide and a first ball-forming roller.
Figure 6:
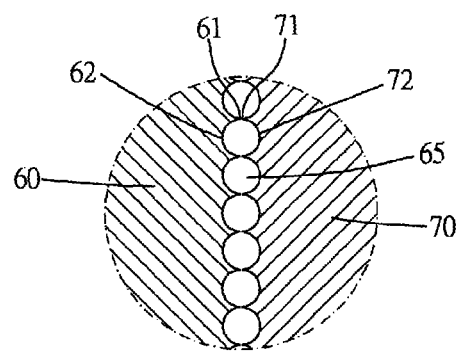
FIG. 6 is a cross sectional view along line 6-6 in FIG. 3, which mainly present the relative positions and structures of the first ball-forming roller and the second ball-forming roller.

The first ball-forming roller 60 is rotatably positioned in the casing 10, and has a wavy surface having a plurality of annular first peaks 61 and a plurality of annular first valleys 62. Each of the first valleys 62 is between two of the adjacent first peaks 61. The first ball-forming roller 60 is closer to the cutter blade 50 than the second ball-forming roller 70. As shown in FIG. 5, the shortest distance D2 between the distal end 51 of the cutter blade 50 and the first peak 61 is provided when the cutter blade 50 rotates to a second position.

The second ball-forming roller 70 is rotatably positioned in the casing 10, and has a wavy surface having a plurality of annular second peaks 71 and a plurality of annular second valleys 72. Each of the second valleys 72 is between two of the adjacent second peaks 71. The first peaks 61 are respectively corresponding to the second peaks 71; similarly, the first valleys 62 are respectively corresponding to the second valleys 72. Therefore, a plurality of ball-forming gaps 65 is defined by the first valleys 62 and the second valleys 72 and between the first ball-forming roller 60 and the second ball-forming roller 70. The first peaks 61 are right adjacent to the corresponding second peaks 71 respectively. The first peak 61 and the second peak 71, being right adjacent to each other at the ball-forming gap 65, could cut the food sheet into thicker food segments. The first ball-forming roller 60 is more close to the cutter blade 50 than the second ball-forming roller 70, and both of the first ball-forming roller 60 and the second ball-forming roller 70 are under the sheet guide 30 and the cutter blade 50.

In addition, the ball-shaped food forming machine further includes a driving means adapted to drive the aforementioned rollers to rotate, wherein the driving means includes a motor and a transmission mechanism, and both of the motor and the transmission mechanism are positioned on an outer surface of the casing 10.

To easily knead the food segments into a ball shape, the rotation direction of the first ball-forming roller 60 at the ball-forming gap 65 is from top to bottom, but the rotation direction of the second ball-forming roller 70 at the ball-forming gap 65 is from bottom to top. As shown in FIG. 3, both of the first ball-forming roller 60 and the second ball-forming roller 70 rotate clockwise. Preferably, the rotation speed of the first ball-forming roller 60 is faster than that of the second ball-forming roller 70.

To remove food residues from the roller surfaces of the first ball-forming roller 60 and the second ball-forming roller 70, a first cleaning sheet and a second cleaning sheet 80 could further respectively positioned near the first ball-forming roller 60 and the second ball-forming roller 70. Specifically, the first cleaning sheet and the second cleaning sheet 80 are positioned in the casing 10, and the distal ends of the first cleaning sheet and the second cleaning sheet 80 are respectively right adjacent to the roller surfaces of the first ball-forming roller 60 and the second ball-forming roller 70

To easily select and collect the formed ball-shaped foods, a grill 90 could be further positioned under the first ball-forming roller 60 and the second ball-forming roller 70. The grill 90 is tilted and positioned in the casing 10. The grill 90 has a plurality of rails 91, and each of gaps between two adjacent rails 91 is preferably smaller than the diameter the formed ball-shaped foods. Therefore, the ball-shaped food could roll along the grill 90 to an outer collection container (not shown), while some ball-shaped food with unqualified sizes or food residues could pass through the gaps and fall in another collection container 100 under the grill 90. The collection container 100 is detachably positioned in the casing 10.

Figure 7:
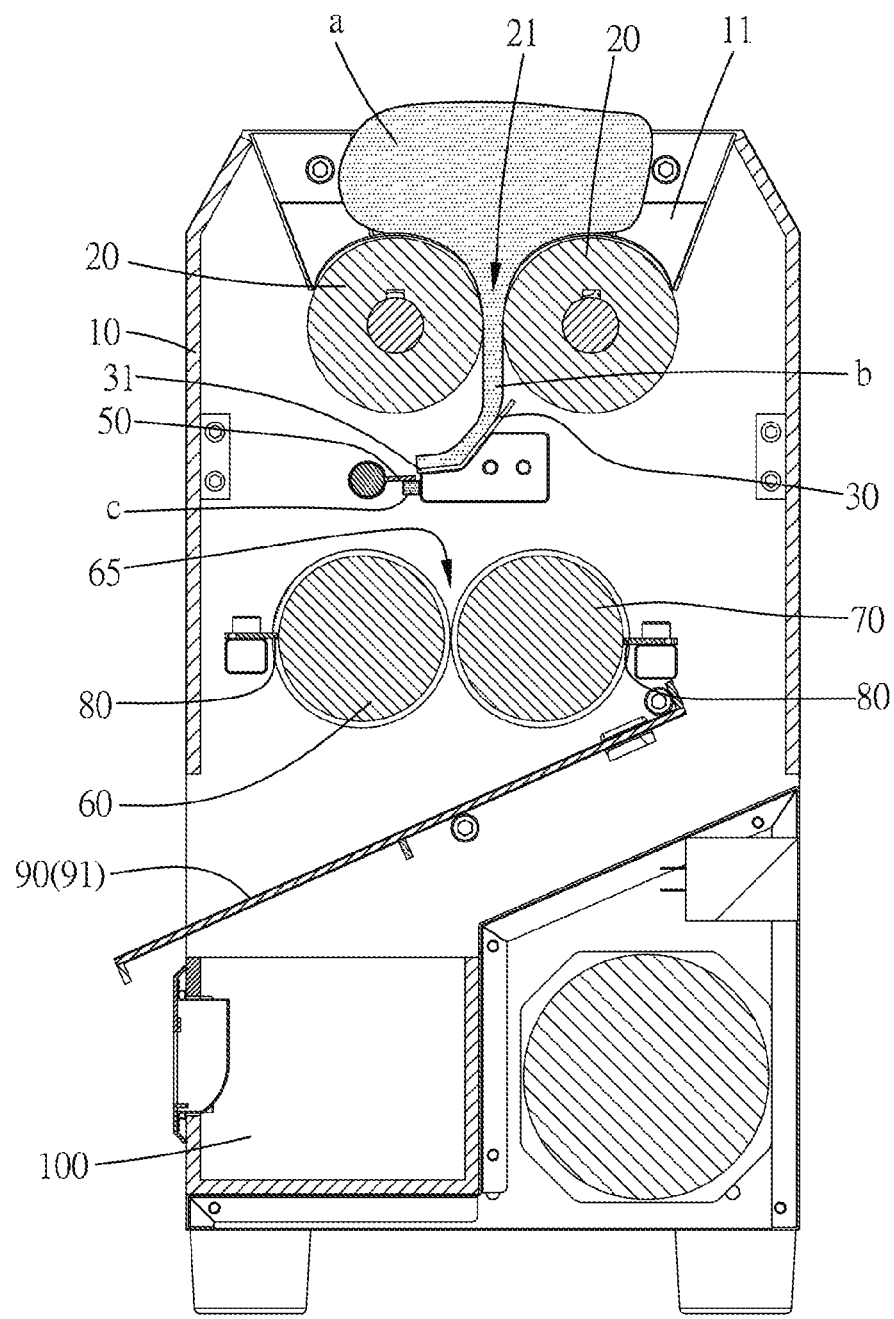
FIG. 7 is a vertical cross sectional view showing the ball-shaped food forming machine of the embodiment of the present invention in use, wherein the cutter blade is at a first position.

The following illustrates the operation of the ball-shaped food forming machine according to a preferred embodiment of the present invention. Please referring to FIG. 7, a food slug a, e.g., dough, is placed in the receiving chamber 11, and then the food slug a would be transported and pressed to form a food sheet b while the two sheet-forming rollers 20 rotates. A thickness of the food sheet b essentially equals to the width D1 of the sheet-forming gap 21. The food sheet b would slide to the cutting end 31 along the sheet guide 30, and then the food sheet b would be trimmed to form food strips c by the shear force from the cutter blade 50 and the sheet guide 30 while the cutter blade 50 goes through the first position.

Figure 8:
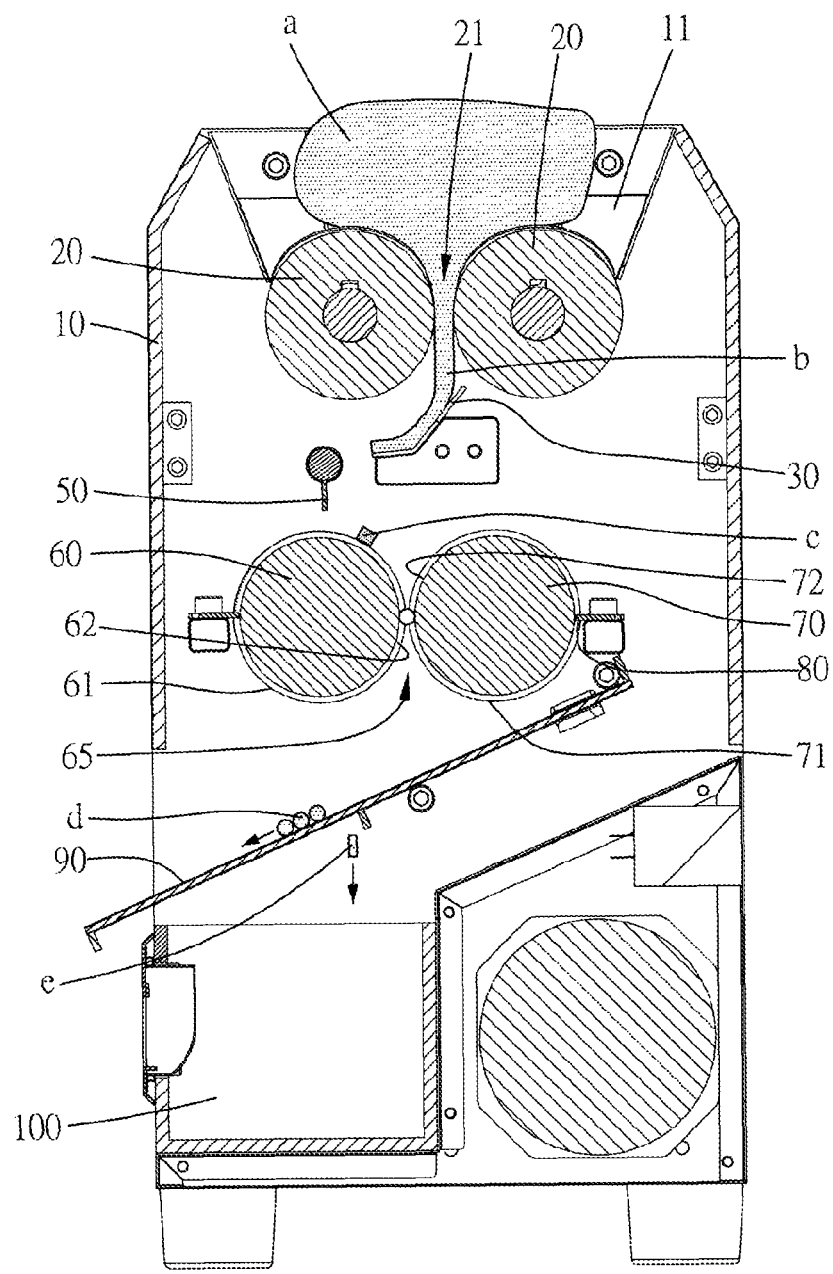
FIG. 8 is a vertical cross sectional view showing a ball-shaped food forming machine of the embodiment of the present invention in use, wherein the cutter blade rotates toward a second position.

Referring to FIG. 8, the food strips c are pushed by the cutter blade 50 to move toward the first ball-forming roller 60. The food strips c would be moved toward the ball-forming gap 65 by the first ball-forming roller 60 while the food strips c contact the first ball-forming roller 60, and then the food strips c would be cut by the first peaks 61 and the second peaks 71 to form a plurality of shorter segments. After that, the segments would be kneaded by the first valleys 62 and the second valleys 72 to form ball-shaped foods d. The ball-shaped foods d can fall on the grill 90 under the ball-forming gap 65 and roll downward to be collected Some food residues, which could be side products, could pass through the gaps of the grill 90 and fall in the collection container 100 under the grill 90. Specifically, there is no transporting component between the cutter blade 50 and the first ball-forming roller 60 which can transport the food strips c. In other words, after the food strips c are cut by the cutter blade 50, the food strips c could be directly pushed by the cutter blade 50 toward the first ball-forming roller 60. This manner enhances processing efficiency and reduces machine volume.

To reduce the machine volume, the ball-shaped food forming machine satisfies the following relations:

$D2/D1<1.5$, so as to shorten the gap between the cutter blade and the first ball-forming roller. Preferably, the ball-shaped food forming machine satisfies the following relation: $D2/D1 \leq 1$, so as to further reduce the process error rate. In the present embodiment, $D2/D1=1$.

Figure 9:
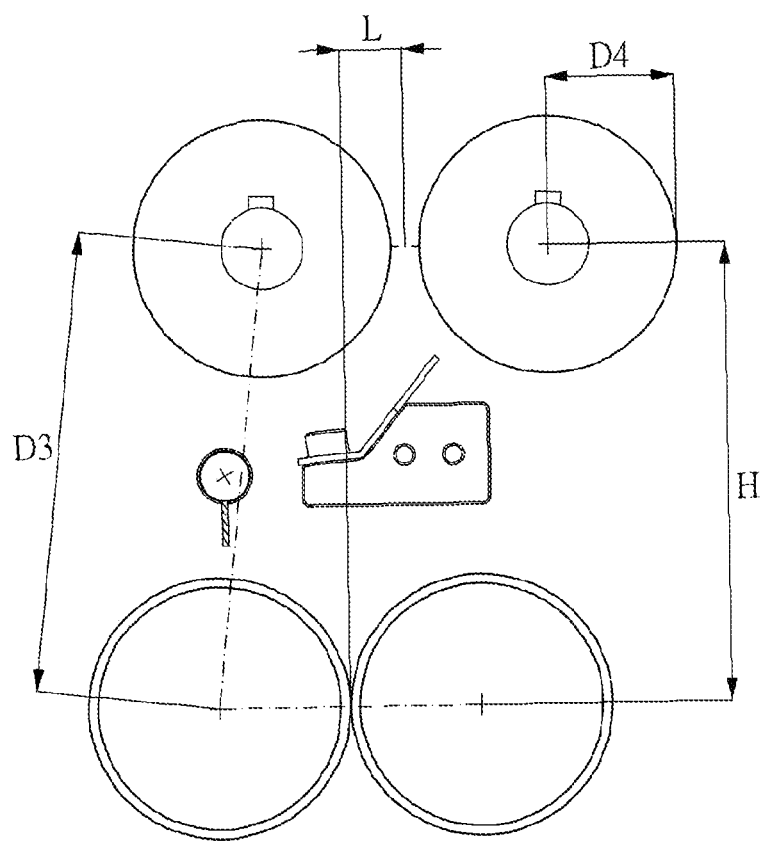
FIG. 9 is a side view showing the relative positions of the main components of a ball-shaped food forming machine of the embodiment of the present invention.

$D3/D1<10$; one of the pair of sheet-forming rollers is closer to the first ball-forming roller than the other one thereof, and a shortest distance D3 between the axis of the first ball-forming roller and the axis of the closer sheet-forming roller, as shown in FIG. 9, such that the first ball-forming roller could be close to the sheet-forming roller as much as possible and thus help reduce the machine volume. In the present embodiment, $D3/D1=8.2$.

$D4/D1<8$; D4 is the radius of each of the sheet-forming rollers, so as to reduce the operation space in the press process. Preferably, the ball-shaped food forming machine satisfies the following relation: $D4/D1<5$, as shown in FIG. 9. In the present embodiment, $D4/D1=4$.

$L/H<0.25$; H is the height difference between the sheet-forming gap and the ball-forming gap; L is the horizontal displacement between the sheet-forming gap and the ball-forming gap, as shown in FIG. 9, such that the ball-shaped food forming machine could have a high and tall exterior, so as to reduce area occupation of a process bench. Preferably, the ball-shaped food forming machine satisfies the following relation: $L/H<0.2$. In the present embodiment, $L/H=0.13$.

$Dw/D1<25$; as shown in FIG. 3A, Dw is the greatest width of the sheet-forming roller, the first ball-forming roller and the second ball-forming roller as a whole. When the ball-shaped food forming machine satisfies the aforementioned conditions, the ball-shaped food forming machine could be down sized. It would be helpful when the machine needs to be transported or installed. In the present embodiment, $Dw/D1=20.8$.

$DH/D1<30$; as shown in FIG. 3A, DH is the greatest height of the sheet-forming roller, the first ball-forming roller and the second ball-forming roller. When the ball-shaped food forming machine satisfies the aforementioned conditions, the ball-shaped food forming machine could also be down sized. In the present embodiment, $DH/D1=25.1$.

In a preferred embodiment, the ratio of the radiuses of the first ball-forming roller and the second ball-forming roller to D1 is less than 5, so that the occupied volumes of the first ball-forming roller and the second ball-forming roller are small, which is helpful to reduce the machine size. In the present embodiment, the ratio is 4.57.

In a preferred embodiment, a lubricating layer is further coated on a surface of the sheet guide 30, so as to reduce the friction between the sheet guide 30 and the food sheet. The food sheet can thus be easily guided toward the cutter blade 50.

In a preferred embodiment, a magnetic reed switch is provided between the casing 10 and the door panel of the casing 10. When the door panel is closed, the switch is on and the food forming machine is ready to be operated. When the door panel is open, the switch is off and the food forming machine is at a stop state. Thus food processing production is prevented to ensure operation security.

In the preferred embodiment, The casing 10 further includes a inclined surface under the second ball-forming roller 70. The inclined surface is tilted toward the collection container 100. For food parts which do not successfully pass through the ball-forming gap 65, the inclined surface is adapted to guide those food parts to toward the collection container 100.

According to the aforementioned invention, a food slug could be efficiently processed to form ball-shaped foods, and the process error rate can be lowered. Time for troubleshooting is thus saved. The production capacity would be efficiently increased, and the processing cost could be lowered, which satisfies the requirements for mass production.

What is claimed is:
1. A ball-shaped food forming machine, which is adapted to cut a food slug to form ball-shaped foods, comprising
   a casing, having a receiving chamber where the food slug is adapted to be placed in;
   a pair of sheet-forming rollers, rotatably disposed in the casing, wherein a sheet-forming gap is defined between the pair of sheet-forming rollers, the sheet-forming gap is communicated with the receiving chamber in a manner that the food slug placed in the receiving chamber is able to be pressed to form a food sheet;
   a sheet guide, fixed in the casing and having a cutting end, wherein the sheet guide is adapted to guide the food sheet from the sheet-forming gap to the cutting end;
   a cutter roller, rotatably disposed in the casing;

a cutter blade, disposed on the cutter roller, the cutter blade being drivable by the cutter roller to rotate about an axis of the cutter roller; when the cutter blade rotates to a first position, a distal end of the cutter blade is right adjacent to the cutting end of the sheet guide in a manner that the food sheet is able to be cut into food strips;

a first ball-forming roller, rotatably disposed in the casing, wherein the first ball-forming roller includes a wavy surface having a plurality of annular first peaks and a plurality of annular first valleys, each of the first valleys is between two of the adjacent first peaks; and a second ball-forming roller, rotatably disposed in the casing, wherein the second ball-forming roller includes another wavy surface having a plurality of annular second peaks and a plurality of annular second valleys, each of the second valleys is between two of the adjacent second peaks, the first peaks are respectively corresponding to the second peaks while the first valleys are respectively corresponding to the second valleys, a plurality of ball-forming gaps are defined between the first ball-forming roller and the second ball-forming roller, the first peaks are right adjacent to the corresponding second peaks respectively, the first ball-forming roller is closer to the cutter blade than the second ball-forming roller;

wherein the first ball-forming roller and the second ball-forming roller are adapted to further cut and press the food strips cut by the cutter blade through the ball-forming gaps to form a plurality of ball-shaped foods;

wherein the cutter blade and the first ball-forming roller are disposed without any food-strip-transporting component disposed therebetween;

wherein the width of the sheet-forming gap is D1, a shortest distance between the distal end of the cutter blade and the first peaks is D2 when the cutting blade rotates to a second position, wherein the ball-shaped food forming machine satisfies the following relation: $D2/D1<1.5$.

2. The ball-shaped food forming machine of claim 1, wherein one of the sheet-forming rollers is closer to the first ball-forming roller than the other one thereof, and a shortest distance between an axis of the first ball-forming roller and an axis of the closer sheet-forming roller is D3, wherein the ball-shaped food forming machine satisfies the following relation: $D3/D1<10$.

3. The ball-shaped food forming machine of claim 1, wherein the radius of each of the sheet-forming rollers is D4, wherein the ball-shaped food forming machine satisfies the following relation: $D4/D1<8$.

4. The ball-shaped food forming machine of claim 1, wherein a height difference between the sheet-forming gap and the ball-forming gap is H, a horizontal displacement between the sheet-forming gap and the ball-forming gap is L, wherein the ball-shaped food forming machine satisfies the following relation: $L/H<0.25$.

5. The ball-shaped food forming machine of claim 1, wherein when the cutter blade is at the second position, the cutter blade is essentially perpendicular to a horizontal surface, and the distal end of the cutter blade is positioned downward.

6. The ball-shaped food forming machine of claim 1, wherein both of the rotation directions of the sheet-forming rollers at the sheet-forming gap are from top to bottom.

7. The ball-shaped food forming machine of claim 1, wherein the rotation direction of the first ball-forming roller at the ball-forming gap is from top to bottom, and the rotation direction of the second ball-forming roller at the ball-forming gap is from bottom to top.

8. A ball-shaped food forming machine comprising
a casing, having a receiving chamber;
a pair of sheet-forming rollers, rotatably disposed in the casing, wherein a sheet-forming gap is defined between the pair of sheet-forming rollers;
a sheet guide, fixed in the casing and having a cutting end, wherein the sheet guide and the receiving chamber are respectively positioned at two opposite sides of the sheet-forming gap;
a cutter roller, rotatably disposed in the casing;
a cutter blade, disposed on the cutter roller, the cutter blade being drivable by the cutter roller to rotate about an axis of the cutter roller, when the cutter blade rotates to a first position, a distal end of the cutter blade is right adjacent to the cutting end of the sheet guide;
a first ball-forming roller, rotatably disposed in the casing, wherein the first ball-forming roller includes a wavy surface having a plurality of annular first peaks and a plurality of annular first valleys, each of the first valleys is between two of the adjacent first peaks; and
a second ball-forming roller, rotatably disposed in the casing, wherein the second ball-forming roller includes another wavy surface having a plurality of annular second peaks and a plurality of annular second valleys, each of the second valleys is between two of the adjacent second peaks, the first peaks are respectively corresponding to the second peaks while the first valleys are respectively corresponding to the second valleys, a plurality of ball-forming gaps are defined between the first ball-forming roller and the second ball-forming roller, the first peaks are right adjacent to the corresponding second peaks respectively, the first ball-forming roller is closer to the cutter blade than the second ball-forming roller;
wherein the first ball-forming roller and the second ball-forming roller are located under the sheet guide and the cutter blade;
wherein the cutter blade and the first ball-forming roller is right adjacent to each other;
wherein the cutter blade and the first ball-forming roller are disposed without any food-transporting component disposed therebetween;
wherein the width of the sheet-forming gap is D1, a shortest distance between the distal end of the cutter blade and the first peaks is D2 when the cutting blade rotates to a second position, wherein the ball-shaped food forming machine satisfies the following relation: $D2/D1<1.5$.

9. The ball-shaped food forming machine of claim 8, wherein one of the sheet-forming rollers is closer to the first ball-forming roller than the other one thereof, and a shortest distance between an axis of the first ball-forming roller and an axis of the closer sheet-forming roller is D3, wherein the ball-shaped food forming machine satisfies the following relation: $D3/D1<10$.

10. The ball-shaped food forming machine of claim 8, wherein the radius of each of the sheet-forming rollers is D4, wherein the ball-shaped food forming machine satisfies the following relation: $D4/D1<8$.

11. The ball-shaped food forming machine of claim 8, wherein a height difference between the sheet-forming gap and the ball-forming gap is H, a horizontal displacement between the sheet-forming gap and the ball-forming gap is L, wherein the ball-shaped food forming machine satisfies the following relation: $L/H<0.25$.

12. The ball-shaped food forming machine of claim 8, wherein when the cutter blade is at the second position, the cutter blade is essentially perpendicular to a horizontal surface, and the distal end of the cutter blade is positioned downward.

13. The ball-shaped food forming machine of claim 8, wherein both of the rotation directions of the sheet-forming rollers at the sheet-forming gap are from top to bottom.

14. The ball-shaped food forming machine of claim 8, wherein the rotation direction of the first ball-forming roller at the ball-forming gap is from top to bottom, and the rotation direction of the second ball-forming roller at the ball-forming gap is from bottom to top.

\* \* \* \* \*